United States Patent
Ueda et al.

(10) Patent No.: US 9,945,435 B2
(45) Date of Patent: Apr. 17, 2018

(54) DISK BRAKE PAD AND DISC BRAKE ASSEMBLY

(71) Applicant: AKEBONO BRAKE INDUSTRY CO., LTD., Tokyo (JP)

(72) Inventors: Masayuki Ueda, Chuo-ku (JP); Isao Ishiguro, Chuo-ku (JP)

(73) Assignee: AKEBONO BRAKE INDUSTRY CO., LTD., Chuo-ku, Tokyo (JP)

( * ) Notice: Subject to any disclaimer, the term of this patent is extended or adjusted under 35 U.S.C. 154(b) by 0 days.

(21) Appl. No.: 14/513,353

(22) Filed: Oct. 14, 2014

(65) Prior Publication Data

US 2015/0101895 A1 Apr. 16, 2015

(30) Foreign Application Priority Data

Oct. 15, 2013 (JP) .................................. 2013-214645

(51) Int. Cl.
*F16D 55/18* (2006.01)
*F16D 65/092* (2006.01)
(Continued)

(52) U.S. Cl.
CPC ......... *F16D 65/092* (2013.01); *F16D 55/226* (2013.01); *F16D 55/228* (2013.01); *F16D 65/095* (2013.01); *F16D 65/0972* (2013.01)

(58) Field of Classification Search
CPC . F16D 65/095; F16D 65/0979; F16D 55/2262
(Continued)

(56) References Cited

U.S. PATENT DOCUMENTS 4,823,920 A * 4/1989 Evans .................... F16D 55/227
188/205 A
4,940,119 A * 7/1990 Kondo ................ F16D 65/0972
188/264 G
(Continued)

FOREIGN PATENT DOCUMENTS

CN 103032490 A 4/2013
FR 2940384 A1 * 6/2010 ........... F16D 65/092
(Continued)

OTHER PUBLICATIONS

Chinese Office Action dated Feb. 14, 2017 from corresponding Chinese patent application No. 201410535584 (with attached English-language translation).
(Continued)

*Primary Examiner* — Anna M Momper
*Assistant Examiner* — Mahbubur Rashid
(74) *Attorney, Agent, or Firm* — Drinker Biddle & Reath LLP

(57) ABSTRACT

A disc brake pad includes a lining and a back plate supporting the lining and having a projecting lug portion and a torque transfer surface. The projecting lug portion projects towards a rotor exit side. The torque transfer surface is disposed at a side edge portion which is situated further radially inwards than the lug portion. The projecting lug portion includes a first projecting arc-shaped surface portion which is disposed at a radially innermost portion of a radially inner surface of the lug portion. A portion of the torque transfer surface which lies near to a radially outer end of the torque transfer surface and which is situated further radially inwards than both of the radially inner surface and an action line of a brake tangential force exerted on braking is most projected toward the rotor exit side on the torque transfer surface.

5 Claims, 18 Drawing Sheets

(51) Int. Cl.
  *F16D 55/226* (2006.01)
  *F16D 55/228* (2006.01)
  *F16D 65/095* (2006.01)
  *F16D 65/097* (2006.01)

(58) Field of Classification Search
  USPC .................................................. 188/72.4
  See application file for complete search history.

(56) References Cited

U.S. PATENT DOCUMENTS

| | | | |
|---|---|---|---|
| 5,060,766 A | | 10/1991 | Kondo |
| 5,125,482 A | * | 6/1992 | Negishi .............. F16D 65/0972 188/73.38 |
| 5,577,577 A | | 11/1996 | Hirai et al. |
| 6,186,288 B1 | | 2/2001 | Baba et al. |
| 6,286,636 B1 | * | 9/2001 | Iwata ................ F16D 65/0978 188/73.31 |
| 6,296,085 B1 | | 10/2001 | Yukoku |
| 6,478,122 B1 | * | 11/2002 | Demoise, Jr. ....... F16D 65/0977 188/73.36 |
| 6,527,090 B1 | | 3/2003 | Barillot et al. |
| 6,533,080 B2 | * | 3/2003 | Miyata .................... F16D 55/00 188/73.37 |
| 2006/0049008 A1 | | 3/2006 | Kinoshita et al. |
| 2007/0215419 A1 | * | 9/2007 | Franz ................. F16D 65/0977 188/250 F |
| 2013/0192938 A1 | * | 8/2013 | Miller ................ F16D 65/0978 188/73.31 |

FOREIGN PATENT DOCUMENTS

| | | | | |
|---|---|---|---|---|
| FR | 2969238 A1 | | 6/2012 | |
| FR | 3005128 A1 | * | 10/2014 | ......... F16D 55/2265 |
| JP | A-H01-216133 | | 8/1989 | |
| JP | A-H08-121511 | | 5/1996 | |
| JP | H08-135696 A | | 5/1996 | |
| JP | 11082570 A | * | 3/1999 | |
| JP | H11-63035 A | | 3/1999 | |
| JP | 2000-027905 A | | 1/2000 | |
| JP | 2001-304310 A | | 10/2001 | |
| JP | 2003139171 A | * | 5/2003 | |
| JP | 2004-278646 A | | 10/2004 | |
| JP | A-2004-316899 | | 11/2004 | |
| JP | A-2011-202779 | | 10/2011 | |

OTHER PUBLICATIONS

Japanese Office Action issued in JP Patent Application No. 2013-214645 dated Jun. 2, 2017 and its English-language translation attached.

EP Office Action dated Oct. 31, 2017 from corresponding European patent application No. 14188922.0 (4 pages).

CN Office Action dated Oct. 16, 2017 from corresponding Chinese patent application No. 201410543558.4 (with attached English-language translation).

\* cited by examiner

DISK BRAKE PAD AND DISC BRAKE ASSEMBLY

BACKGROUND

The present invention relates to an improvement in a disc brake pad which is incorporated in a disc brake which is used to apply the brakes of a vehicle such as a motor vehicle and a disc brake assembly. Specifically, the invention relates to a realization of a construction which can suppress effectively the generation of abnormal noise called brake squeal even in a case where a pressure exerted on a brake pad by a piston is weak as when the vehicle is slowed while driven at low speeds.

A disc brake assembly is widely used to apply the brakes of a motor vehicle. When the brakes are applied by the disc brake assembly, a pair of pads which are provided so as to hold a rotor which rotates together with a wheel are pressed against both side surfaces of the rotor. An opposed-piston type disc brake assembly shown in FIG. 15 or a floating caliper-type disc brake assembly shown in FIG. 16 is widely used traditionally as the disc brake assembly described above.

Of these brake assemblies, in the opposed piston-type disc brake assembly shown in FIG. 15, a caliper 4 having an outer body 2 and an inner body 3 is provided in a position where the outer body 2 and the inner body 3 hold a rotor 1 therebetween, and an outer cylinder and an inner cylinder are provided in the outer and inner cylinders, respectively, so that respective opening portions face opposite to each other. Additionally, an outer piston and an inner piston are fitted in the outer cylinder and the inner cylinder, respectively, in an oil-tight fashion so as to be displaced in an axial direction. An outer pad and an inner pad are held in the outer body 2 and the inner body 3, respectively, so as to be displaced individually in the axial direction. When the brakes are applied, hydraulic oil is sent into the outer cylinder and the inner cylinder under pressure, so that the outer pad and the inner pad are pressed against inner and outer side surfaces of the rotor 1 by the outer piston and the inner piston.

When referred to in this specification and claims, axial direction, circumferential direction and radial direction denote axial direction, circumferential direction and radial in relation to a rotor in such a state that a disc brake pad is incorporated in the disc brake assembly, respectively, unless otherwise described. Further, a rotor entrance side denotes a side where the rotor which rotates together with a wheel enters the caliper 4, and a rotor exit side of the caliper 4 denotes a side where the rotor exits from the caliper 4.

On the other hand, in the disc brake assembly shown in FIG. 16 which has the floating caliper, a caliper 4a is supported at supports 5 which are provided so as to lie adjacent to one side of a rotor 1 in such a way as to be displaced in an axial direction. Additionally, a pair of pads 6, 6 which are disposed on axial sides of the rotor 1 are also supported at the supports 5 so as to be displaced in the axial direction. A cylinder portion 7 and caliper claws 8 are provided on the caliper 4a so as to hold both the pads 6, 6 therebetween from both axial sides. Of these caliper constituent portions, a piston 9 is incorporated in the cylinder portion 7 so as to press the inner pad 6 (which is situated nearer to a middle of the vehicle in a widthwise direction in such a state that the caliper 4a is assembled to the vehicle, that is, the lower pad in FIG. 16) against the rotor 1. When applying the brakes, oil is sent into the cylinder portion 7 under pressure, so that the inner pad 6 is pressed against an inner side surface of the rotor 1 from bottom to top in FIG. 16 by the piston 9. Then, the caliper 4a is displaced downwards in FIG. 16 as a reaction to the pressing force exerted on the pad 6 by the piston 9, whereby the caliper claws 8 presses the outer pad 6 (which is situated outers of the vehicle in the widthwise direction in such a state that the caliper 4a is assembled to the vehicle, that is, the upper pad in FIG. 16) against the outer side surface of the rotor 1. As a result of this, the rotor 1 is strongly held on the inner and outer side surfaces thereof by the pads 6, this applying the brake.

Even with the opposed piston-type disc brake assembly shown in FIG. 15 and the floating caliper-type disc brake assembly shown in FIG. 16, it is known that the postures of the pads are made unstable when the brakes are applied, thereby causing abnormal noise called brake squeal. Then, to suppress the generation of such abnormal noise, various constructions have been proposed traditionally as described in Patent Documents 1 to 5, for example. FIGS. 17 and 18 show an example of a disc brake assembly 1 which incorporates therein disc brake pads of a conventional construction which is almost the same as that of the disc brake assembly described in Patent Document 1.

In the case of the depicted construction, a pad 6a includes a lining 10 and a metallic shoe or back plate 11 which is attached to be supported on a rear surface of the lining 10. A pair of projecting lug portions 12a, 12b are provided individually at radially middle portions of circumferential side edge portions of the back plate 11 so as to project in a circumferential direction from the circumferential side edge portions. Additionally, flat torque transfer surfaces 13a, 13b are provided individually on the circumferential side edge portions at portions which are situated further radially inwards than the lug portions 12a, 12b. Further, the lug portions 12a, 12b and the torque transfer surfaces 13a, 13b are continuously connected to each other by recess portions 14a, 14b where the back plate 11 is recessed towards a middle side of the pad 6a.

On the other hand, a pair of guide portions 16a, 16b are provided individually on a pad supporting member 15 which supports the pads 6a so as to move in an axial direction. Then, guiding recessed grooves 17a, 17b are formed in radial middle portions on side surfaces of both the guide portions 16a, 16b which face each other in a circumferential direction, and flat torque bearing surfaces 18a, 18b are formed at portions which are situated further radially inwards than the guiding recessed grooves 17a, 17b. The pad supporting member 15 corresponds to a caliper of an opposed piston-type disc brake assembly or to a support of a floating caliper-type disc brake assembly.

Then, the lug portions 12a, 12b are brought into loose engagement with the guiding recessed grooves 17a, 17b in interiors thereof, respectively, and the torque transfer surfaces 13a, 13b are disposed opposite to the torque bearing surfaces 18a, 18b, respectively, whereby the pads 6a are supported on the pad supporting member 15 so as to move in the axial direction.

When a rotational direction of the rotor while the vehicle is traveling forwards is counterclockwise as seen in FIG. 17, a brake tangential force F {=µ (pad friction coefficient)×S (cylinder area)×P (cylinder hydraulic pressure)} is exerted on a center point A of a frictional surface of the lining 10. This moves the pad 6a towards a rotor exit side (a trailing side, a left hand side in FIG. 17), whereby the torque transfer surface 13a and the torque bearing surface 18a at the rotor exit side are brought into abutment with each other. In the case of the conventional construction, the torque transfer surface 13a and the torque bearing surface 18a are configured as flat surfaces on imaginary planes which are at right angles to an application line of the brake tangential force F, and therefore, the torque transfer surface 13a and the torque bearing surface 18a are brought into abutment (surface abutment) with each other over the whole surfaces thereof. Because of this, a reaction force is exerted on the brake pad 6a at a point B which is a radially central position of the torque transfer surface 13a which is spaced away (offset) radially inwards by a distance $L_0$ from the point A which is the point of action of the brake tangential force F. Consequently, a moment $M_0$ {=F (brake tangential force)×$L_0$ (distance between A and B)} is exerted on the pad 6a, whereby the pad 6a is rotated counterclockwise. This applies a radially inward pressing force (a couple of force) $Q_0$ to the lug portion 12a of the lug portions 12a, 12b which is situated at the rotor exit side, and this pressing force attempts to press a radially inner surface of the lug portion 12a against a radially inner surface of the guiding recessed groove 17a. Then, the pad 6a is rotated further counterclockwise while the radially inner surface of the rotor exit side lug portion 12a is dragged to the rotor exit side in relation to the radially inner surface of the guiding recessed groove 17a in such a state that the pressing force $Q_0$ is exerted on the pad 6a. Then, finally, a radially outer surface of the lug portion 12b which is situated at the rotor entrance side is brought into abutment with a radially outer surface of the guiding recessed groove 17b with which the lug portion 12b is in engagement.

As has been described above, in the case of the conventional construction, the back plate 11 which makes up the pad 6a can be supported (restrained) on the pad supporting member 15 at a total of three locations including the torque transfer surface 13a at the rotor exit side, the radially inner surface of the lug portion 12a at the rotor exit side and the radially outer surface of the lug portion 12b at the rotor entrance side. This enables the posture of the pad 6a to be stabilized when the brakes are applied, thereby making it possible to suppress the generation of abnormal noise called brake squeal.

However, in the case of the conventional construction that has been described above, it becomes difficult to suppress the brake squeal in the event that the pressing force exerted on the pad 6 by the piston is weak when the brakes are applied while the vehicle is being driven at low speeds.

Namely, in the case of the conventional construction, since the radially inner surface of the lug portion 12a at the rotor exit side is formed into the flat surface, the contact point between the radially inner surface of the lug portion 12a and the radially inner surface of the guiding recessed groove 17a is made unstable, and a corner portion 19 which resides at a distal edge portion of the radially inner surface of the lug portion 12a tends to strike easily the radially inner surface of the guiding recessed groove 17a at its edge (tends to be easily caught). Because of this, as shown in FIG. 18, a frictional resisting force $W_0$ {=μn (pad friction coefficient)×$Q_0$ (pressing force)} acting in the direction of the rotor entrance side is exerted on a point C which is a longitudinal central position (a circumferential central position) of the radially inner surface of the lug portion 12a when the pad 6a slides towards the rotor exit side. At the same time, a push-up force f acting radially outwards is exerted on the corner portion 19. Of these forces, the frictional resisting force $W_0$ generates a moment $r_{A0}$ {=$W_0$ (frictional resisting force)×$X_0$ (distance between B and C)} which attempts to rotate the pad 6a in an opposite direction (clockwise) to the moment $M_0$ which is based on the brake tangential force F about a center line which passes through the point B which is the radially central position of the torque transfer surface 13a at the rotor exit side. On the other hand, the push-up force f generates a moment $r_{B0}$ {=f (push-up force)×K (distance from point C to corner portion 19)} which attempts to rotate the pad 6a in an opposite direction to the moment $M_0$ about a center line which passes through the point C which is the longitudinally central position of the radially inner surface of the lug portion 12a. Because of this, a moment $R_0$ ($r_{A0}+r_{B0}$) becomes larger which acts to cancel the moment M0 which attempts to rotate the pad 6a counterclockwise by such an extent that the corner portion 19 becomes easy to be caught by the radially inner surface of the guiding recessed groove 17a (by the magnitude of $r_{B0}$). Consequently, it becomes difficult to rotate the pad 6a counterclockwise ($M_0-R_0$ becomes smaller), whereby, it becomes difficult to bring the radially outer surface of the lug portion 12b at the rotor entrance side into abutment with the radially outer surface of the guiding recessed groove 17b. In particular, when the pressing force exerted on the pad 6a by the piston is weak, since the moment $M_0$ it self becomes smaller as the brake tangential force F decreases, it becomes difficult to bring the radially outer surface of the lug portion 12b at the rotor entrance side 12b into abutment with the radially outer surface of the guiding recessed groove 17b. As a result, it becomes difficult to support the pad 6a on the pad supporting member 15 at the three points (generating a state in which the pad 6a is supported at two points), whereby the posture of the pad is made unstable, which facilitates the generation of brake squeal.

In addition, in the case of the conventional construction, since the torque transfer surface 13a at the rotor exit side is formed into the flat surface, the point B which is the radially central position of the torque transfer surface 13a constitutes the center of the moment $r_{A0}$, and the distance $X_0$ to the application line of the frictional resisting force $W_0$ becomes large. This increases the moment the moment $r_{A0}$, whereby it becomes difficult to rotate the pad 6a counterclockwise based on the moment $M_0$ which is based on the brake tangential force F. As a result of this, when the pressing force exerted on the pad 6a by the piston is weak, the brake squeal becomes easy to be generated. Additionally, since the torque transfer surface 13a at the rotor exit side is formed into the flat surface, in particular, when the pressing force exerted on the pad 6a by the piston is weak, the contact state between the torque transfer surface 13a and the torque bearing surface 18a is made unstable easily (they become loose to rattle). Consequently, the posture of the pad 6a becomes unstable due to this reason, whereby brake squeal is easy to be generated.

[Patent Document 1] JP-A-8-135696
[Patent Document 2] JP-A-2000-27905
[Patent Document 3] JP-A-2004-278646
[Patent Document 4] JP-A-11-63035
[Patent Document 5] JP-A-2001-304310

SUMMARY

It is one advantageous aspect of the present invention to provide a construction of a disc brake pad and a construction of a disc brake assembly which can effectively suppress the generation of brake squeal even in the event that a pressing force by a piston is weak.

According to one aspect of the invention, there is provided a disc brake pad, configured to be supported to a pad supporting member so as to move in an axial direction of a rotor, the disc brake pad comprising:

a lining; and a back plate, supporting a rear surface of the lining, having a projecting lug portion and a torque transfer surface at a side edge portion of the back plate which is situated at an exit side of the rotor, wherein the projecting lug portion projects towards the exit side, the torque transfer surface is disposed at a portion of the side edge portion which is situated further inwards than the lug portion in a radial direction of the rotor, the projecting lug portion includes a first projecting arc-shaped surface portion which is disposed at a radially innermost portion of a radially inner surface of the lug portion, and a portion of the torque transfer surface which lies near to a radially outer end of the torque transfer surface and which is situated further radially inwards than both of the radially inner surface and an action line of a brake tangential force exerted on braking is most projected toward the exit side on the torque transfer surface.

The disc brake pad may be configured such that: the torque transfer surface includes a second projecting arc-shaped surface portion at a radially outer end portion of the torque transfer surface, and a part of the second projecting arc-shaped surface portion is most projected toward the rotor exit side on the torque transfer surface.

The torque transfer surface may include an inclined surface portion which is inclined towards an entrance side of the rotor as the inclined surface portion extends further radially inwards.

The side edge portion of the back plate may include a recess portion which is concaved towards an entrance side of the rotor between the lug portion and the torque transfer portion.

According to another aspect of the invention, there is provided a disc brake assembly comprising:

a pad supporting member; and a pair of pads, each of which is the disc brake pad according to the above, and which are supported on the pad supporting member so as to move in an axial direction in relation thereto, and a piston which presses both the pads individually against both side surfaces of a rotor, wherein the pad supporting member includes a guiding recessed groove configured to be brought into loose engagement with the lug portion, at a rotor exit side thereof, and the pad supporting member includes a torque bearing surface configured to be brought into abutment with the torque transfer surface, at a portion thereof which is situated further radially inwards than the guiding recessed groove.

DETAILED DESCRIPTION OF EXEMPLIFIED EMBODIMENTS

FIGS. 1 to 14 show an embodiment of the invention. In this embodiment, a case will be described in which disc brake pads 21*a*, 21*b* of the invention are incorporated in an opposed piston-type disc brake assembly 20 which is one of types of disc brakes. In the case of this embodiment, too, as in the case of the conventional construction shown in FIG. 17, a rotational direction of a rotor when a vehicle is traveling forwards will be described as being counterclockwise.

Figure 1:
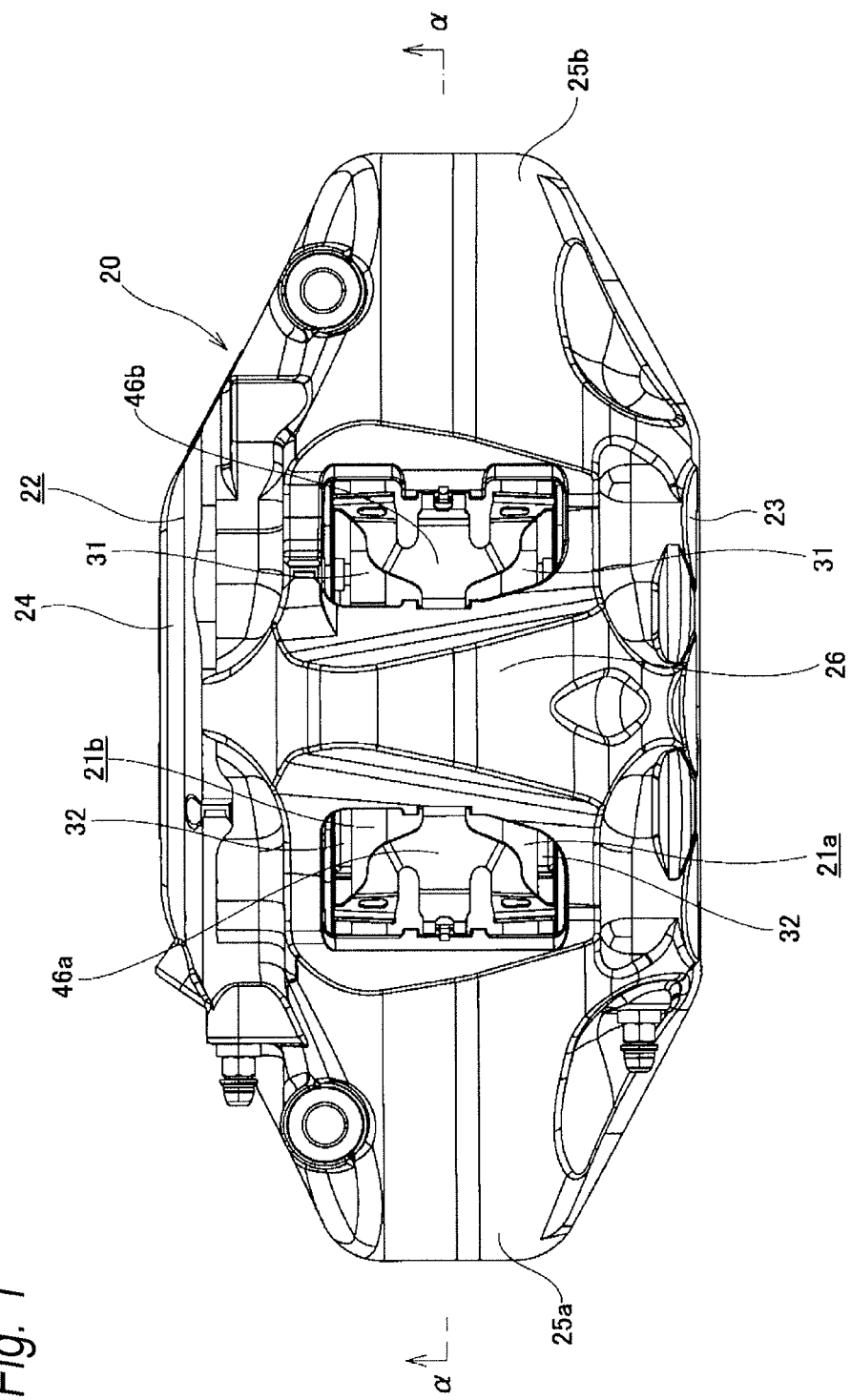
FIG. 1 is a front projection of an opposed piston-type disc brake assembly of an embodiment of the invention as seen from a radially outside position.
Figure 2:
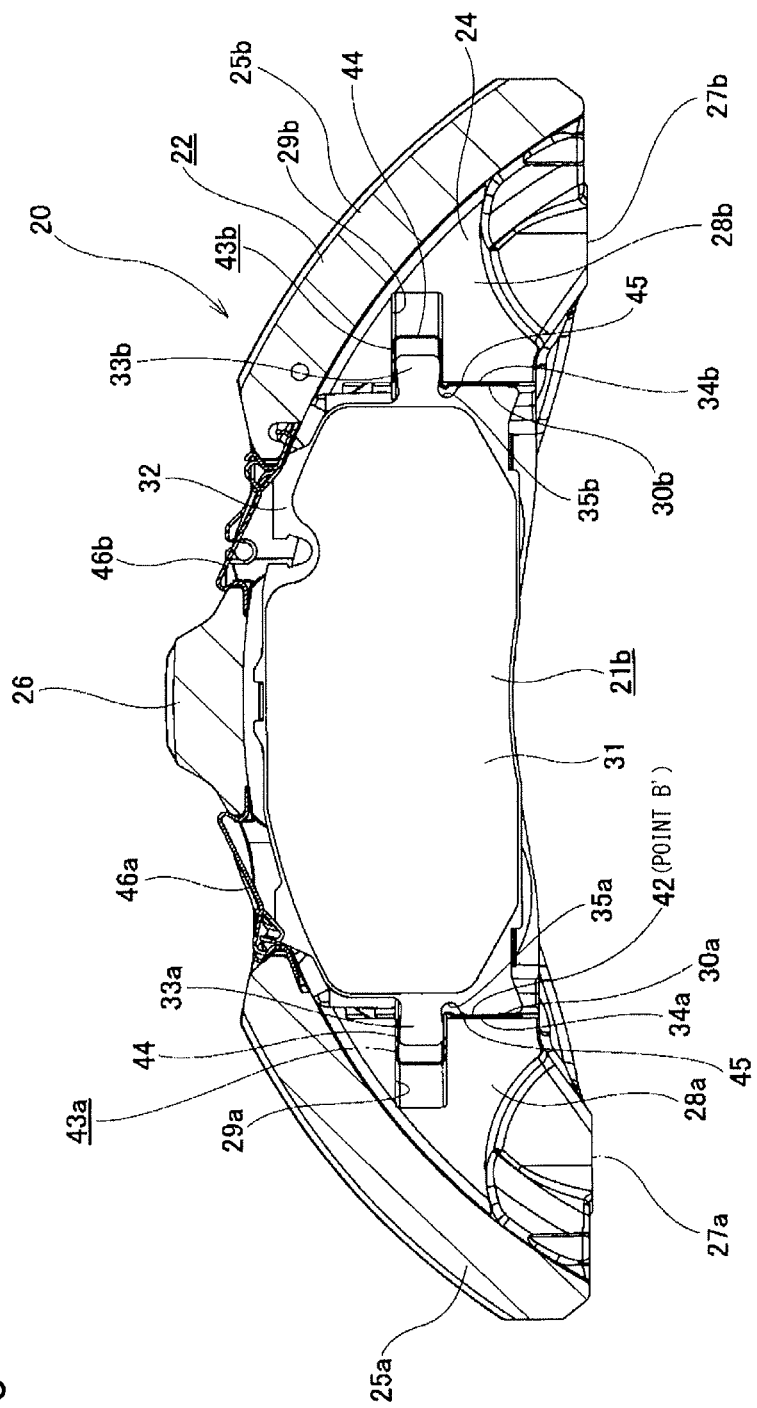
FIG. 2 is a sectional view of the same disc brake assembly taken along the line α-α in FIG. 1.
Figure 4:
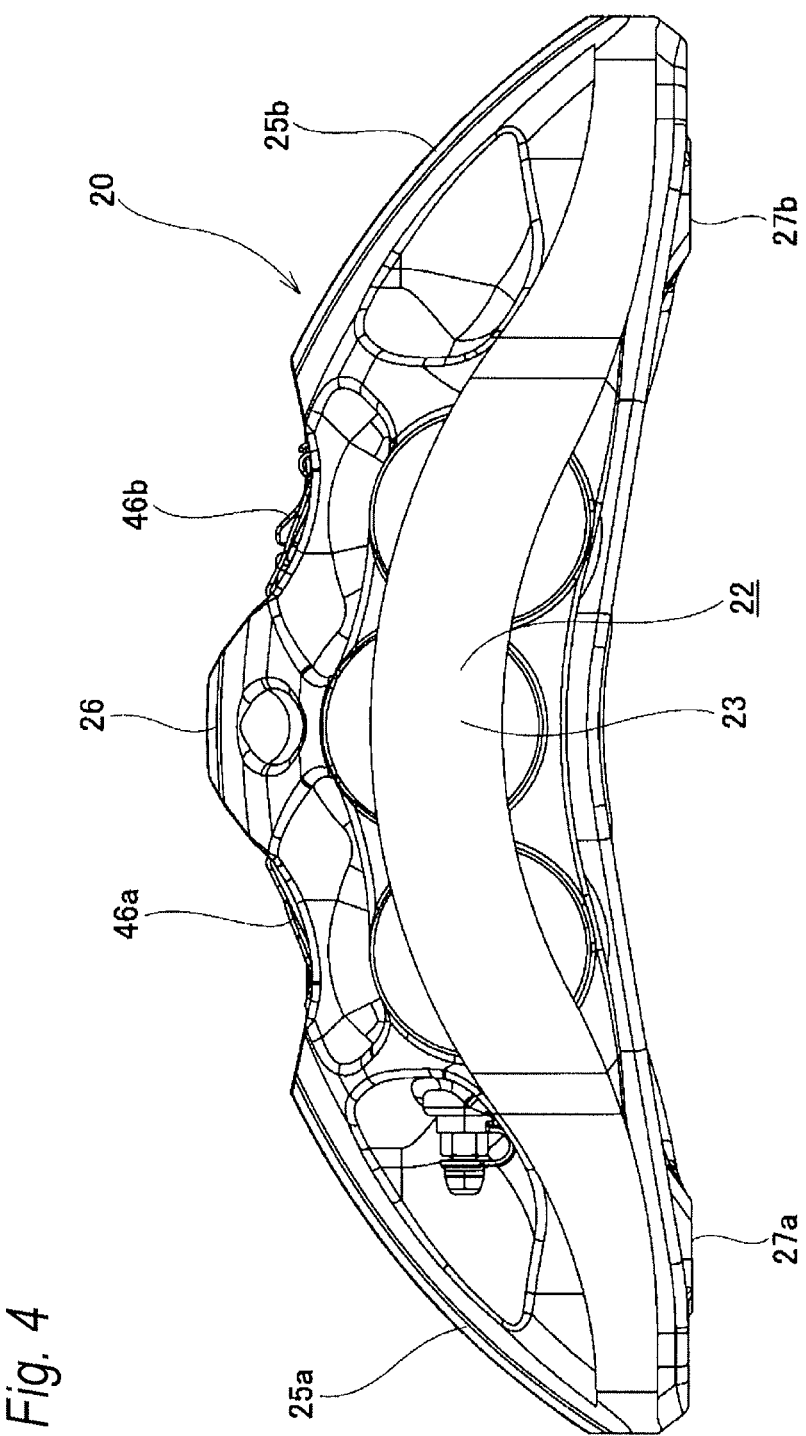
FIG. 4 is a front projection of the same disc brake assembly as seen from an outer side.
Figure 5:
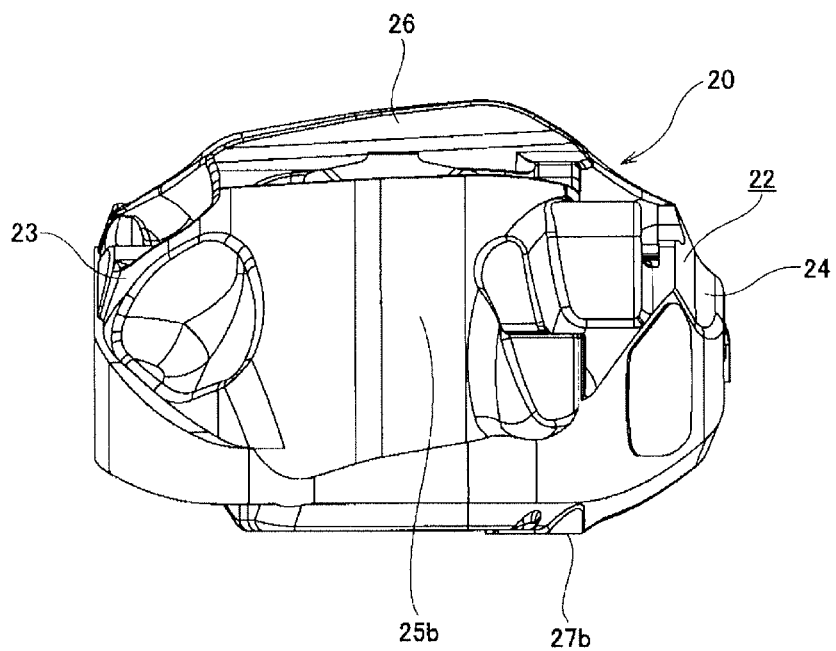
FIG. 5 is a front projection of the same disc brake assembly as seen from a right hand side of FIG. 1.
Figure 6:
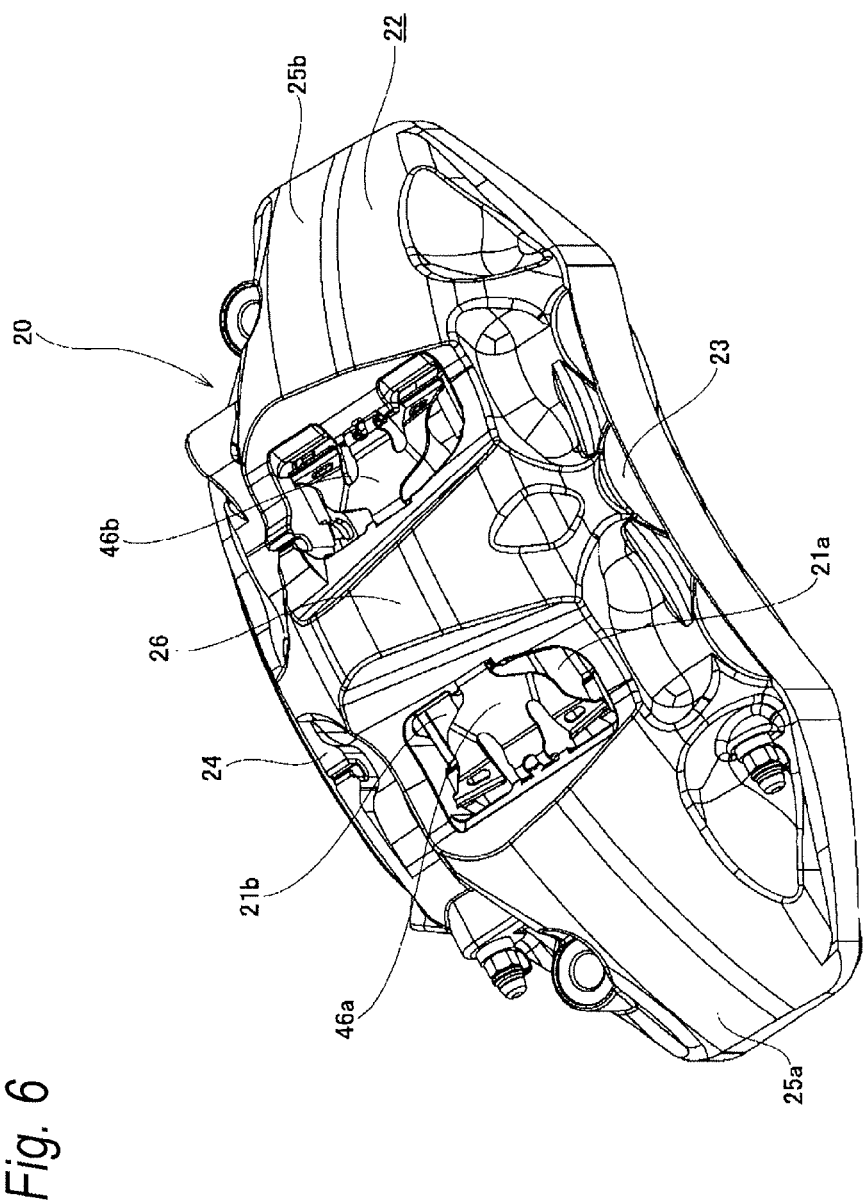
FIG. 6 is a perspective view of the same disc brake assembly as seen from the outer side and the radially outer position.
Figure 7:
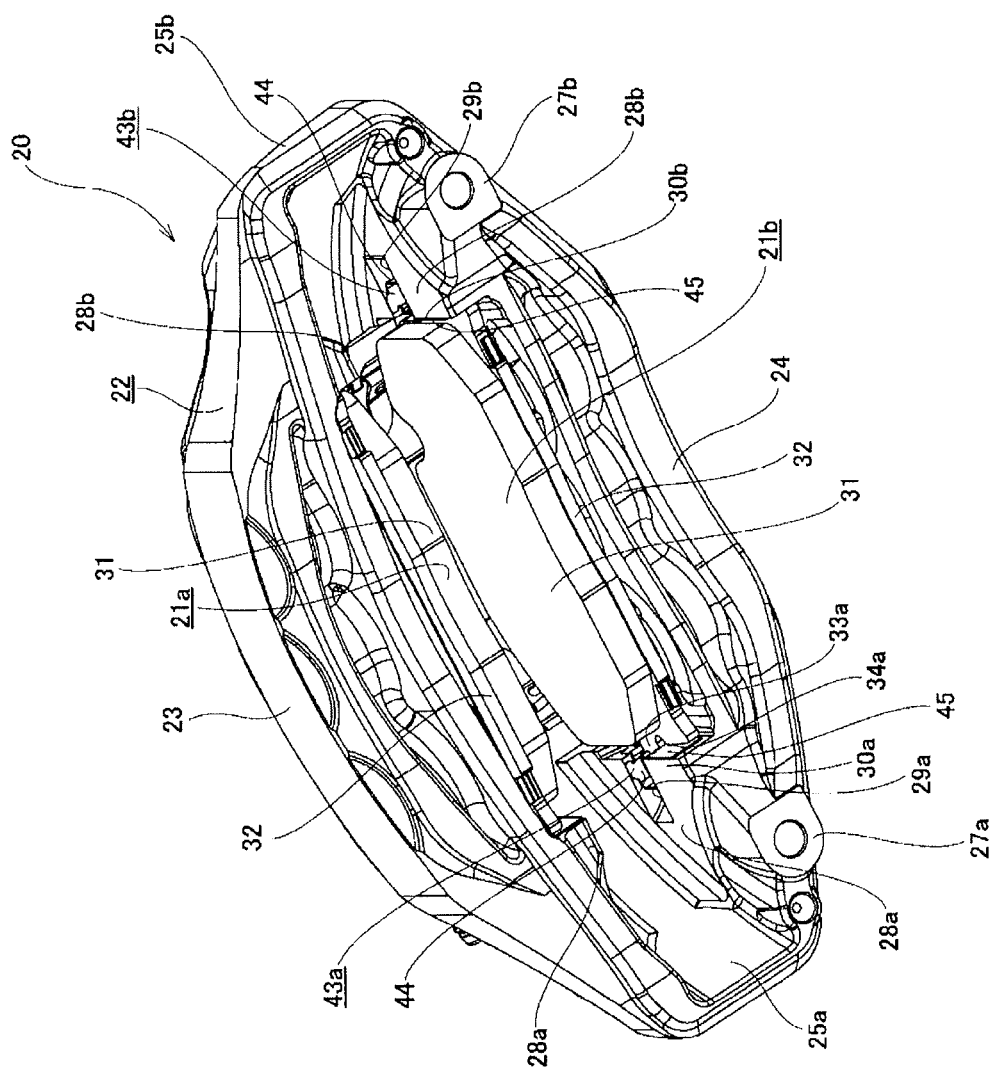
FIG. 7 is a perspective view of the same disc brake assembly as seen from an outer side and a radially inner position.
Figure 8:
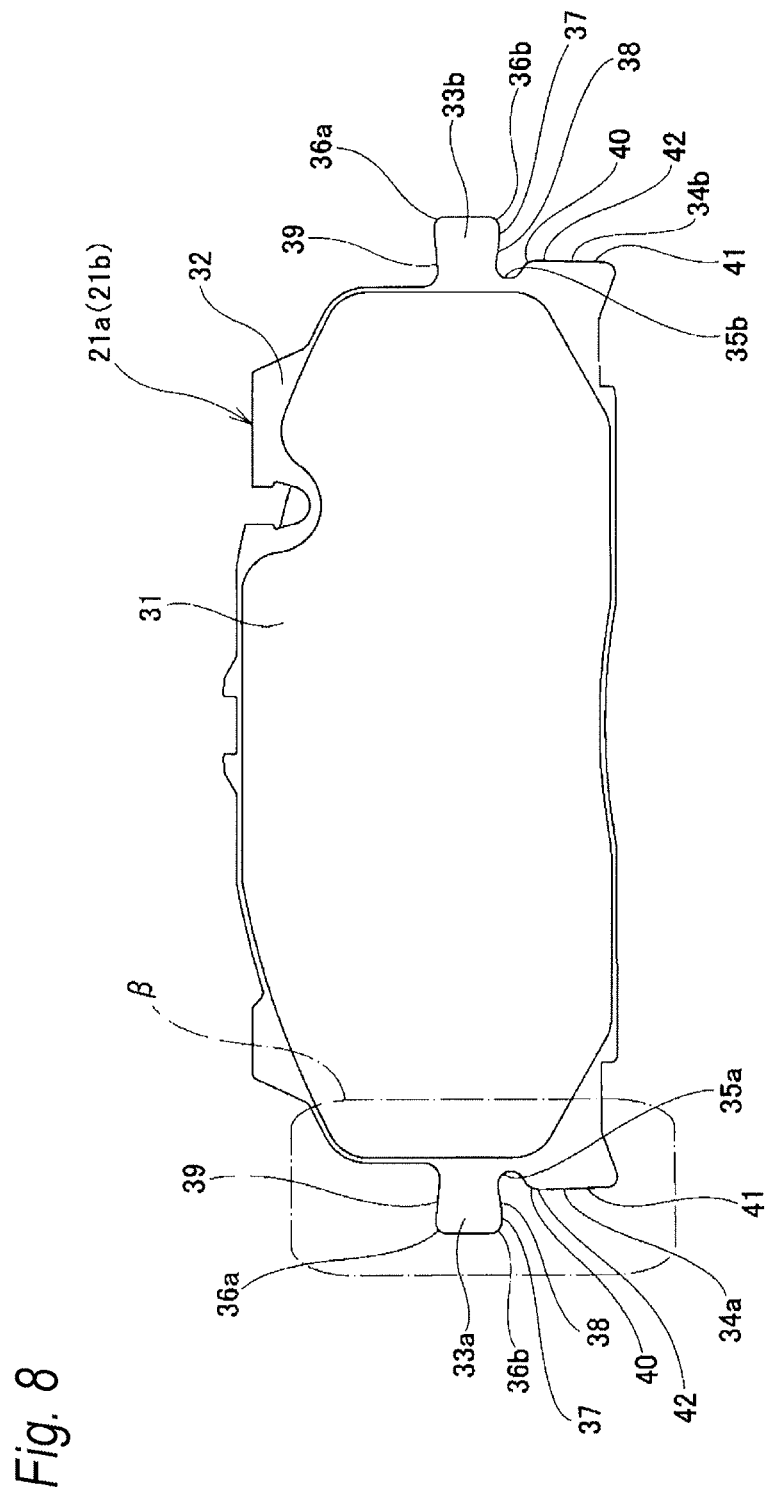
FIG. 8 is a front view of a pad which is taken out of the same disc brake assembly.

A caliper 22, which makes up the disc brake assembly 20, supports both outer and inner pads 21*a*, 21*b* so as to move in an axial direction (a vertical direction as seen in FIG. 1, a front-to-back direction as seen in FIGS. 2, 4, and in a left-to-right direction as seen in FIG. 5). The caliper 22 configured in this way has an outer body portion 23 and an inner body portion 24 which are provided so as to hold a rotor therebetween, connecting portions 25*a*, 25*b* which connect individually end portions of both the body portions 23, 24 which are situated at rotor exit sides (a left-hand side in FIGS. 1, 2, 4) thereof and end portions which are situated at rotor entrance sides (a right-hand side in FIGS. 1, 2, 4) thereof, and a bridge portion 26 which connects circumferentially central portions of the outer and inner body portions 23, 24. Three outer cylinders and three inner cylinders are provided in the outer body portion 23 and the inner body portion 24, respectively. Then, pistons are fitted in the outer cylinders and the inner cylinders in an oil tight fashion and so as to be displaced in relation to the axial direction. This caliper 22 is fixedly supported on a vehicle body side (at a knuckle of a suspension assembly) by a pair of mounting seats 27*a*, 27*b* which are provided on the inner body portion 24.

A pair of guide wall portions 28*a*, 28*b* are each provided at circumferential end portions of opposed inner surfaces (axial inner surfaces) of the outer body portion 23 and the inner body portion 24. Each of the guide wall portions 28*a*, 28b has a fan shape and projects in the axial direction. Guiding recessed grooves 29a, 29b are formed in radially middle portions of circumferentially opposed side surfaces of the guide wall portions 28a, 28b so as to extend in a direction which is almost at right angles to the side surfaces. Additionally, flat torque bearing surfaces 30a, 30b (which lie on imaginary planes which are at right angles to a brake tangential force F, which will be described later) are formed individually at radially inner portions of opening portions of the guiding recessed grooves 29a, 29b. Radially outer surfaces and radially inner surfaces of the guiding recessed grooves 29a, 29b are formed parallel to each other. Angles formed by the radially inner surfaces and the torque bearing surfaces 30a, 30b are about 90 degrees. Depth-wise dimensions of the guiding recessed grooves 29a, 29b (depth-wise dimensions of the same grooves to bottom surfaces thereof) are sufficiently larger than lengthwise dimensions of lug portions 33a, 33b, which will be described later, (projecting amounts of the same lug portions from corresponding torque transfer surfaces 34a, 34b). Consequently, in the case of this embodiment, there is no such situation in which distal end faces of the lug portions 33a, 33b come into abutment with the bottom surfaces of the guiding recessed grooves 29a, 29b.

The pads 21a, 21b each include a lining (a friction material) 31 and a metallic shoe or back plate (a pressure plate) 32 which supports a back surface of the lining 31. The pair of lug portions 33a, 33b each having a projecting shape are provided individually at radially middle portions of circumferential side edge portions of the back plate 32 so as to project in a circumferential direction from the corresponding side edge portions. Namely, of these lug portions 33a, 33b, the lug portion 33a at a rotor exit side of the back plate 32 is provided at the radially middle portion of the side edge portion at the rotor exit side of the back plate 32 so as to project to the rotor exit side. The lug portion 33b at a rotor entrance side of the back plate 32 is provided at the radially middle portion of the side edge portion at the rotor entrance side of the back plate so as to project to the rotor entrance side. In the case of this embodiment, the shapes and positions of the lug portions 33a, 33b are made to coincide with each other in relation to the radial direction. Additionally, the torque transfer surfaces 34a, 34b are formed on the circumferential side edge portions of the back plate 32 at portions which lie further radially inwards than the lug portions 33a, 33b so as to project further circumferentially than portions which lie further radially outwards than the lug portions 33a, 33b. The lug portions 33a, 33b and the torque transfer surfaces 34a, 34b are connected to each other so as to continue smoothly by recess portions 35a, 35b, having substantially a C shape when seen from the front, which are curved (recessed) towards the center of the pads 21a, 21b.

In particular, in the case of this embodiment, the shapes of radially inner surfaces of the lug portions 33a, 33b and the shapes of the torque transfer surfaces 34a, 34b are devised. However, in the case of this embodiment, the shapes of the lug portion 33a and the torque transfer surface 34a which are provided at the rotor exit side and the shapes of the lug portion 33b and the torque transfer surface 34b which are provided at the rotor entrance side are made symmetrical in relation to center lines of the pads 21a, 21b. Because of this, the description of the lug portion 33b and the torque transfer surface 34b which are provided at the rotor entrance side will be the same as or a repetition of the description of the lug portion 33a and the torque transfer surface 34a which are provided at the rotor exit side excluding the description of their positions in relation to the circumferential direction which are described as rotor exit side or rotor entrance side. Therefore, like reference numerals will be given to like portions, and the description thereof will be omitted. Thus, hereinafter, only the lug portion 33a and the torque transfer surface 34a which are at the rotor exit side will be described.

Figure 9:
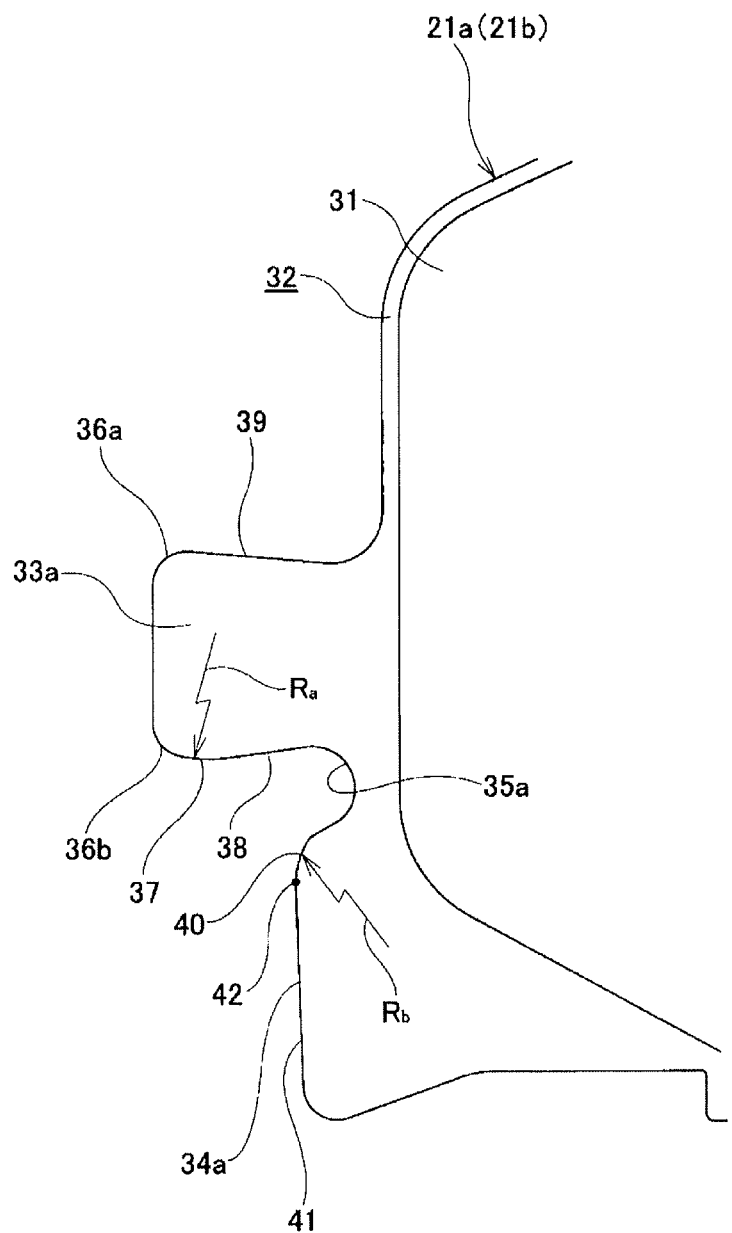
FIG. 9 is an enlarged view of a portion β in FIG. 8.
Figure 10:
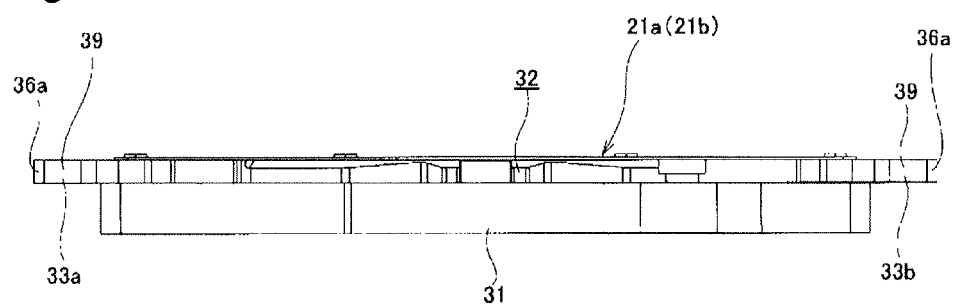
FIG. 10 is a plan view of the pad which is taken out of the same disc brake assembly.
Figure 11:
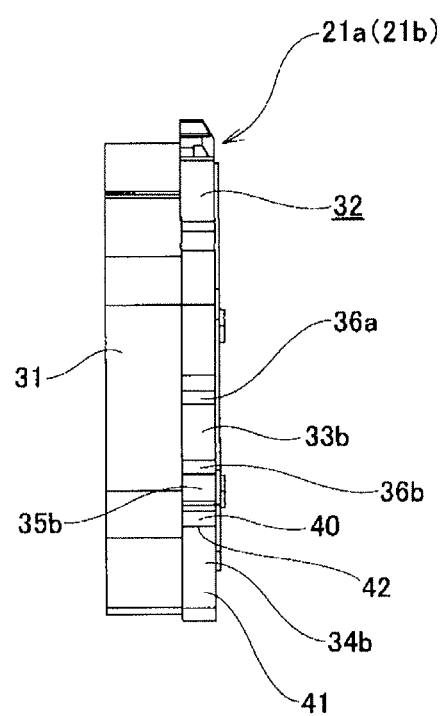
FIG. 11 is a right-hand side view of the pad taken out of the same disc brake assembly.
Figure 12:
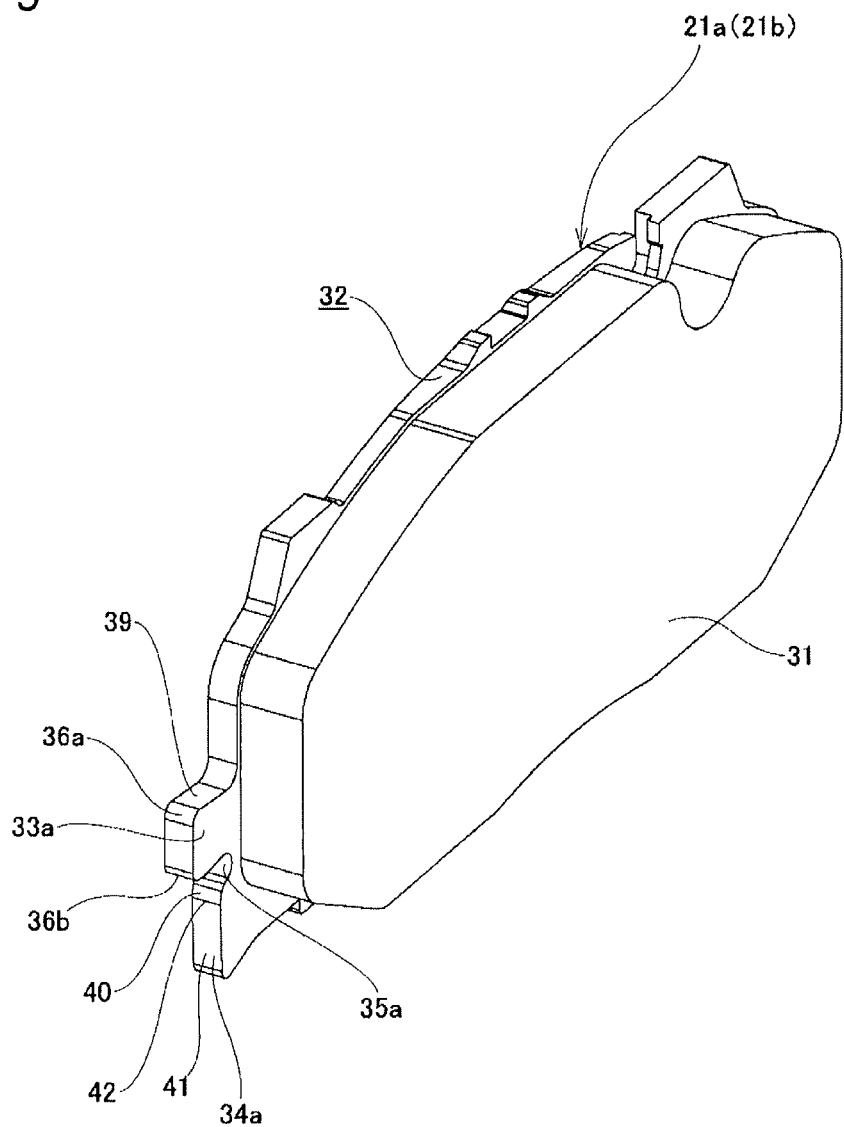
FIG. 12 is a perspective view of the pad taken out of the same disc brake assembly as seen from a radially outer position.
Figure 13:
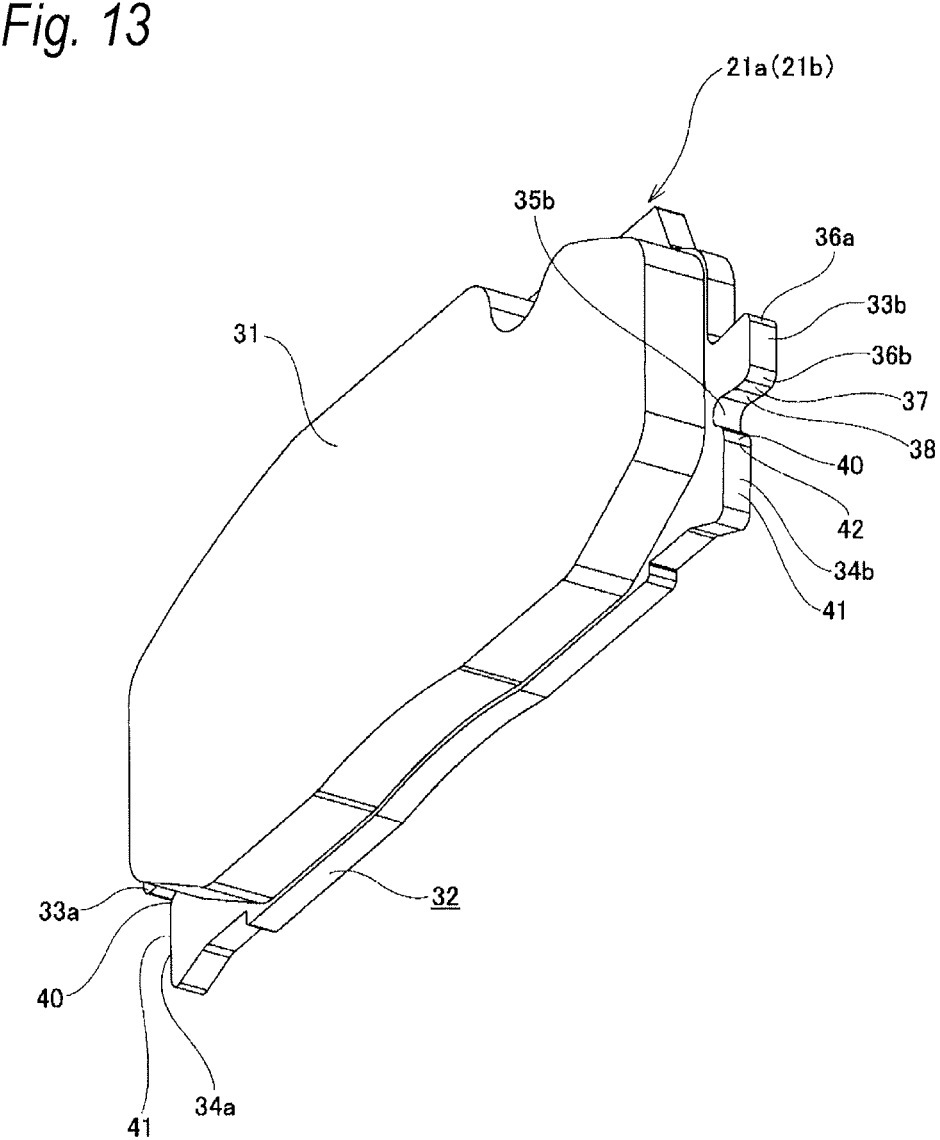
FIG. 13 is a perspective view of the pad taken out of the same disc brake assembly as seen from a radially inner position.

As shown in FIG. 9, partially cylindrical chamfered portions 36a, 36b are formed at connecting portions between the distal end face and a radially outer surface and the radially inner surface of the lug portion 33a. The radially inner surface of the lug portion 33a is formed by connecting together (part of) the chamfered portion 36b, a lug lower projecting arc-shaped surface portion 37 (a first projecting arch-shaped surface portion) and a lug lower inclined surface portion 38 sequentially in that order from a distal end side to a proximal end side so as to continue smoothly. In these three connected portions, the lug lower projecting arc-shaped surface portion 37 is formed at a middle portion of the lug portion 33a and projects in such a way as to be curved radially inwards. Additionally, the lug lower projecting arc-shaped surface portion 37 constitutes a partially cylindrical surface of which a radius of curvature is Ra and a center line of curvature is disposed in the axial direction in such a state that the pad 21a (21b) is incorporated in the caliper 22, and an apex portion of the lug lower projecting arc-shaped surface portion 37 is situated in a radially innermost position on the radially inner surface of the lug portion 33a. The lug lower inclined surface portion 38 is inclined further radially outwards as it extends towards the proximal end side of the lug portion 33a. In contrast to the radially inner surface of the lug portion 33a, the radially outer surface thereof is formed by connecting together (part of) the chamfered portion 36a and a lug upper inclined surface portion 39 sequentially in that order from the distal end side to the proximal end side so as to continue smoothly. Of these portions, the lug upper inclined surface portion 39 is inclined further radially inwards as it extends towards the proximal end side of the lug portion 33a.

In addition, in the case of this embodiment, the torque transfer surface 34a is formed by connecting together a side projecting arc-shaped surface portion 40 (a second projecting arc-shaped surface portion) which is formed at a radially outer end portion and a side inclined surface portion 41 which is formed over a range from a radially outer portion to a radially inner end portion by the radially outer portion so as to continue smoothly. In these portions, the side projecting arc-shaped surface portion 40 constitutes a partially cylindrical surface of which a radius of curvature is Rb and a center line of curvature is disposed in the axial direction in such a state that the pad 21a (21b) is incorporated in the caliper 22. A connecting portion 42 (a point B') with the side inclined surface portion 41 is situated in a position which projects most towards the rotor exit side and is curved so as to approach the rotor entrance side as it extends radially outwards. The radius of curvature Rb in relation to the side projecting arc-shaped surface portion 40 is smaller than the radius of curvature Ra in relation to the lug lower projecting arc-shaped surface portion 37 (for example, the former is half of the latter). On the other hand, the side inclined surface portion 41 is inclined so as to approach the rotor entrance side (the central side of each of the pads 21a, 21b) as it extends radially inwards. Because of this, in relation to the side inclined surface portion 41, the connecting portion 42 with the side projecting arc-shaped surface portion 40 is situated in the position which projects most towards the rotor exit side. Additionally, although an inclination angle of the side inclined surface portion 41 can be set to an arbitrary angle, the inclination angle with respect to the torque bearing surface 30a ranges substantially, for example, 1 to 10° (preferably 2° or 3°). In the case of this embodiment, by configuring the torque transfer surface 34a in this way, the connecting portion 42 (the point B') which is situated most radially outwards in the torque transfer surface 34a is situated in the position which projects most towards the rotor exit side. Additionally, this connecting portion 42 is situated further radially inwards than the radially inner surface (the apex of the lug lower projecting arc-shaped surface portion 37) of the lug portion 33a and is also situated further radially inwards than an action line (an action point A) of the brake tangential force F, which will be described later.

Pad clips 43a, 43b are provided individually between the circumferential side edge portions of the back plate 32 and the guide wall portions 28a, 28b. The pad clips 43a, 43b are each made of a metallic plate such as a stainless steel plate having elasticity and resistance to corrosion. These pad clips 43a, 43b include clamping portions 44, 44 having a substantially U-shaped section and held portions 45, 45 which are bent from the clamping portions 44, 44 so as to extend radially inwards. In the case of this embodiment, the lug portions 33a, 33b are loosely fitted in the corresponding guiding recessed grooves 29a, 29b via the clamping portions 44, 44 for engagement. Additionally, the torque transfer surfaces 34a, 34b are made to face the torque bearing surfaces 30a, 30b via the held portions 45, 45. Providing the pad clips 43a, 43b configured in this way not only prevents sliding portions between the back plate 32 and the guide wall portions 28a, 28b from rusting but also suppresses the generation of wear at the sliding portions.

Further, in the case of this embodiment, a pair of shuttle springs 46a, 46b, which are each made of a plate spring, are provided individually between the pads 21a, 21b and the caliper 22. Specifically, the shuttle springs 46a, 46b are provided individually between a connecting portion 25a at the rotor exit side and the central bridge portion 26 and between a connecting portion 25b at the rotor entrance side and the central bridge portion 26 so as to be stretched therebetween. These shuttle springs 46a, 46b press outer circumferential edge portions of portions of the pads 21a, 21b which lie near the circumferential ends thereof radially inwards so as to prevent the pads 21a, 21b from rattling against the caliper 22 when the brakes are not applied.

In the case of the embodiment configured in the way described above, even in the event that the pressing force by the piston is weak (when the brakes are applied lightly) as when the brakes are applied while the vehicle is being driven at low speeds, the generation of brake squeal can be suppressed effectively.

Figure 3:
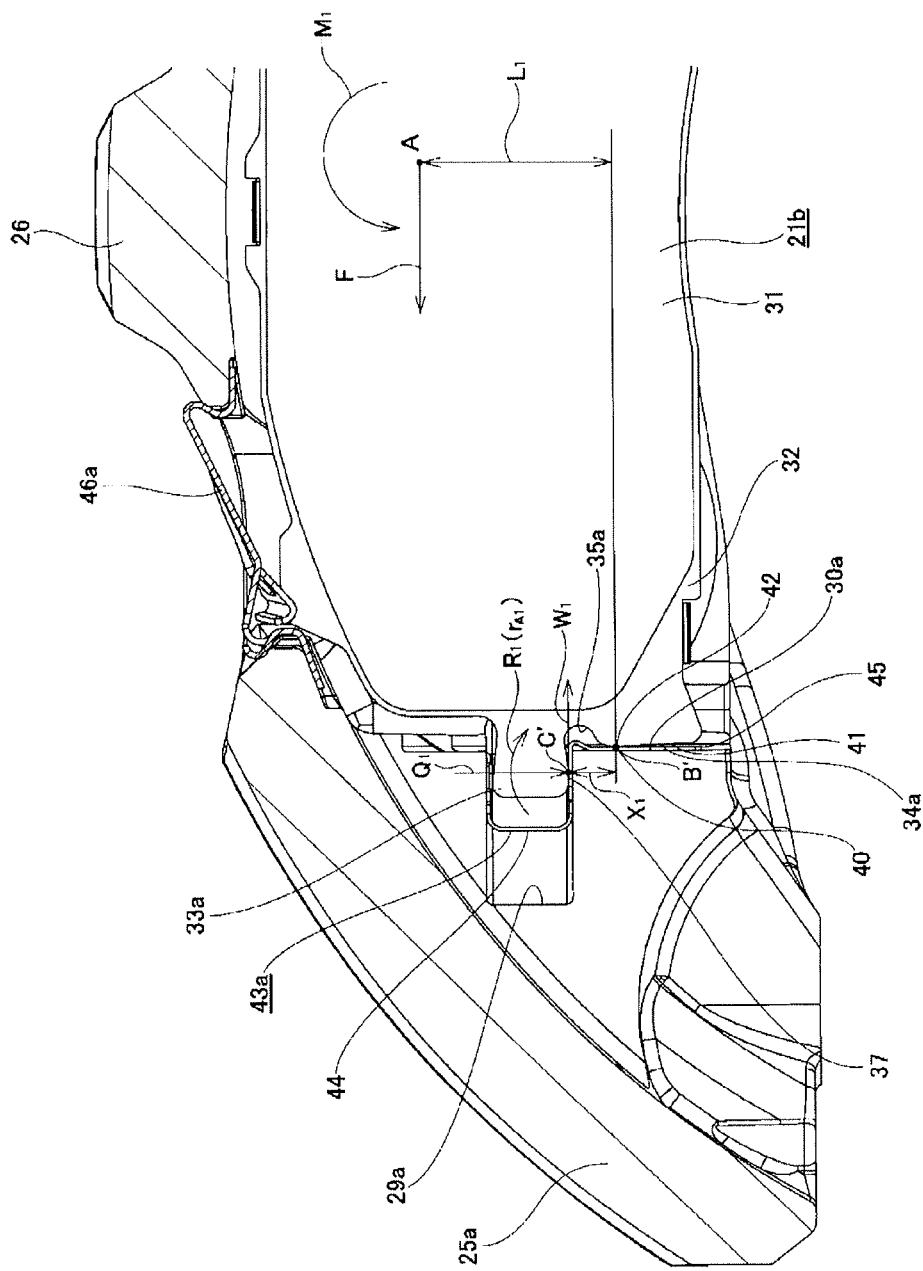
FIG. 3 is an enlarged view of a left hand half portion of the same disc brake assembly in section shown in FIG. 2

Hereinafter, the reason that the working effect described above can be obtained will be described specifically by reference to FIG. 3.

In the case of this embodiment, too, the brake tangential force F in the direction of a tangent to the rotor is exerted on a point A at the center (a pad effective diameter that is determined by the diameter or arrangement of the piston) of a frictional surface of the lining 31 which makes up the pad 21b. This moves the pad 21b towards the rotor exit side (a trailing side, a left-hand side in FIG. 3), whereby the torque transfer surface 34a at the rotor exit side and the torque bearing surface 30a are brought into abutment with each other via the held portion 45 of the pad clip 43a. In the case of this embodiment, since the connecting portion 42 which is situated most radially outwards in the torque transfer surface 34a is situated in the position which projects most towards the rotor exit side in the torque transfer surface 34a, this connecting portion 42 is brought into abutment with the torque bearing surface 30a in line contact via the held portion 45 in association with the movement of the pad 21b towards the rotor exit side. Because of this, a reaction force is exerted to the point B' or the connecting portion 42 which lies (is offset) radially inwards by a distance $L_1$ away from the point A which is the point of action of the brake tangential force F, Consequently, a moment $M_1$ {=F (brake tangential force)×based on $L_1$ (distance between A and B')} is exerted on the pad 21b to rotate the pad counterclockwise.

This exerts a radially inward pressing force (a couple of force) $Q_1$ to the lug portion 33a at the rotor exit side, and this pressing force attempts to press the radially inner surface of the lug portion 33a against the radially inner surface of the guiding recessed groove 29a. Here, in the case of this embodiment, a point C' which constitutes the apex portion of the lug lower projecting arc-shaped surface portion 37 which is formed on the radially inner surface of the lug portion 33a is situated most radially inwards. Therefore, the point C' which is the apex portion is pressed against the radially inner surface of the guiding recessed groove 29a via the clamping portion 44 of the pad clip 43a. This can stabilize the contact point between the radially inner surface of the lug portion 33a and the radially inner surface of the guiding recessed portion 29a (the clamping portion 44), whereby the radially inner surface of the lug portion 33a can be prevented from striking the radially inner surface of the guiding recessed groove 29a (the clamping portion 44) at the edge thereof when the brakes are applied. Consequently, it is possible to prevent the generation of the moment $r_{B0}$ which is generated based on the push-up force f in the conventional construction shown in FIGS. 17 and 18 so as to cancel the moment $M_1$ based on the brake tangential force F (it is possible to make $r_{B0}$ zero).

Moreover, in the case of this embodiment, the point B' which is the connecting portion 42 situated at the portion on the torque transfer surface 34a which lies near to the radially outward end thereof (the portion lying closer to the lug portion 33a than to the radially central position) constitutes a center of a moment $r_{A1}$ which is based on a frictional resisting force $W_1$ {=μn (friction coefficient)×$Q_0$ (pressing force)}. Because of this, a distance $X_1$ from a line of action of the frictional resisting force $W_1$ to the center of the moment $r_{A1}$ can be reduced more than in the conventional construction ($X_1$<$X_0$). Consequently, the moment $r_{A1}$ based on the frictional resisting force $W_1$ is suppressed to a lower level than in the conventional construction ($r_{A1}$<$r_{A0}$).

Thus, in the case of this embodiment, a moment $R_1$ (=$r_{A1}$+0) which acts to cancel the moment $M_1$ based on the brake tangential force F can be reduced sufficiently. Because of this, even in the event that the pressing force exerted by the piston is weak, the pad 21b can easily be rotated in the counterclockwise direction which is a direction in which the moment $M_1$ based on the brake tangential force F acts (the result of $M_1$-$R_1$ can be ensured to be large). As a result of this, a radially outer surface of the lug portion 33b at the rotor entrance side can be brought into abutment with a radially outer surface of the guiding recessed groove 29b by rotating the pad 21b further in the counterclockwise direction while dragging the radially inner surface (the lug lower projecting arc-shaped surface portion 37) of the lug portion 33a to the rotor exit side in relation to the radially inner surface of the guiding recessed groove 29a. In particular, in the case of this embodiment, since the sufficiently large moment $M_1$ can be ensured, the radially outer surface of the lug portion 33b at the rotor entrance side can be brought into abutment with the radially outer surface of the guiding recessed groove 29b although the shuttle spring 46b disposed at the rotor entrance side exhibits the radially inward spring force. Consequently, even in the event that the pressing force exerted by the piston is weak, the pad 21a (21b) can be supported on the caliper 22 at the three locations, thereby making it possible to suppress the generation of brake squeal.

The other configurations and working effects are the same as those of the conventional construction described before.

Hereinafter, an experiment carried out to verify the advantage of the invention will be described.

Figure 17:
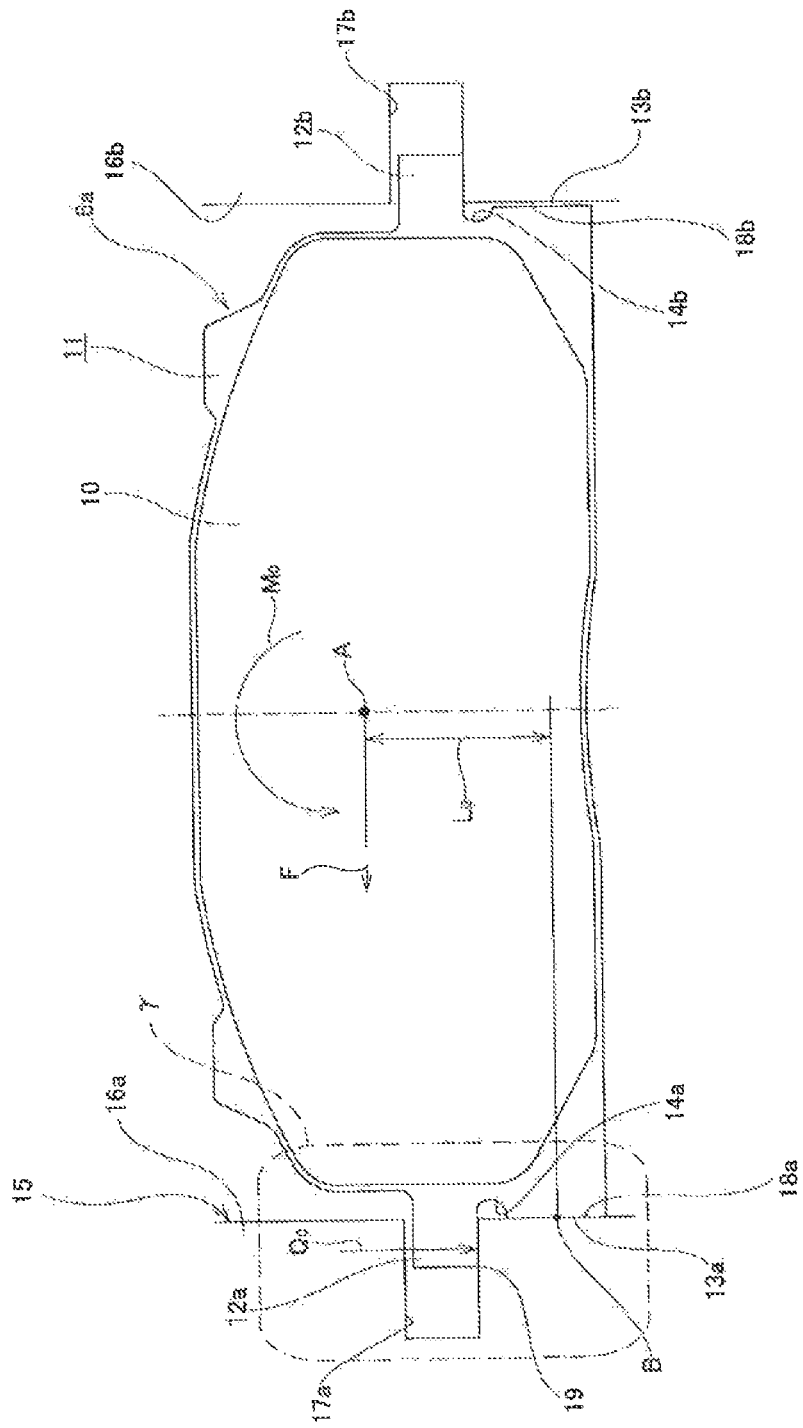
FIG. 17 is a sectional view of an example of a conventional construction showing an imaginary plane which is at right angles to a rotation axis of a rotor.
Figure 18:
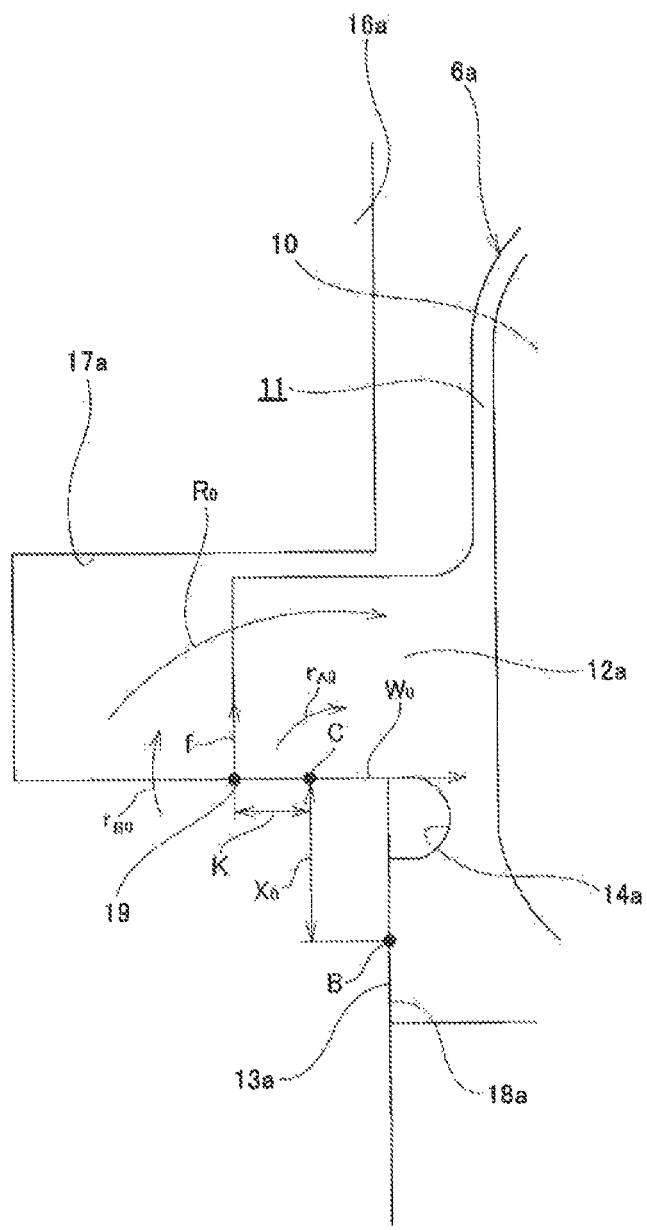
FIG. 18 is an enlarged view of a portion γ in FIG. 17.

In this experiment, a relationship between the magnitude of a pressing force exerted by the piston (a hydraulic pressure inside the cylinder) and the magnitude of a moment exerted on the pad when the brakes are applied (M−R) was obtained through experiment by using a disc brake pad which was configured according to the embodiment described above and a disc brake pad which was configured according to the conventional construction shown in FIGS. 17 and 18. Specifically, a pad was used as the pad according to the invention in which the lug lower projecting arc-shaped surface portions having a radius of curvature of 10 mm were provided at radially inner surfaces of the lug portions, side projecting arc-shaped surface portions having a radius of curvature of 5 mm were provided at radially outer end portions of torque transfer surfaces and side inclined surface portions having an inclination angle of 2° were provided so as to occupy the remaining portions of the transfer surfaces. In contrast to this, a pad was used as a pad according to a comparison example in which both radially inner surfaces of lug portions and torque transfer surfaces were formed into a flat surface. In this experiment, although the pads used were different in the configuration of the radially inner surfaces of the lug portions and the torque transfer surfaces, the configurations of the remaining portions of the pads were the same, and the configurations of calipers into which the pads were incorporated were also the same overall. The magnitude of a moment (M−R) exerted on each pad was obtained by measuring an amount of strain at a proximal end portion of a radially outer surface of the lug portion at the rotor entrance side by using a strain gauge which was affixed to the proximal end portion. Namely, the magnitude of the moment (M−R) was measured by obtaining an amount of distortion (an amount of strain) at the lug portion when the radially outer surface of the lug portion at the rotor entrance side was pressed against a radially outer surface of a guiding recessed groove.

Figure 14:
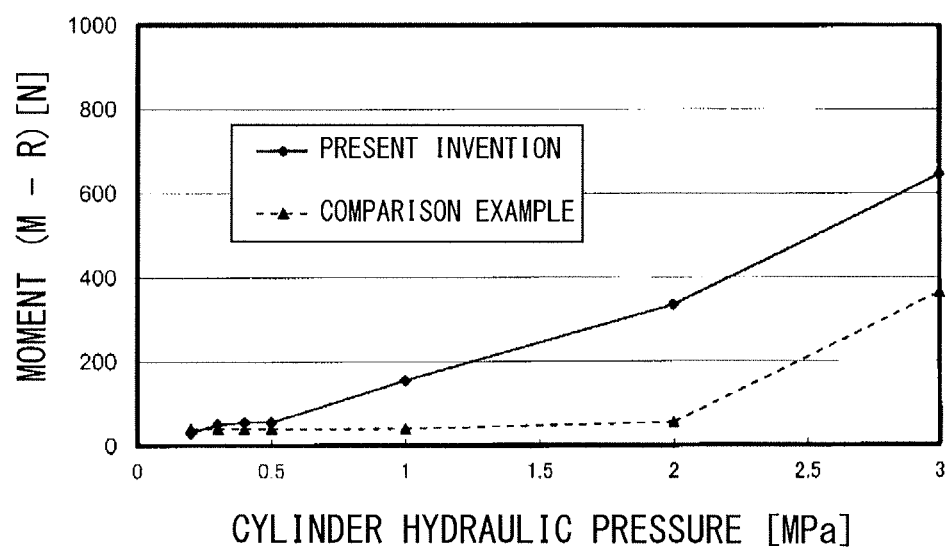
FIG. 14 is a graph showing the results of an experiment carried out to verify the advantage of the invention.
Figure 15:
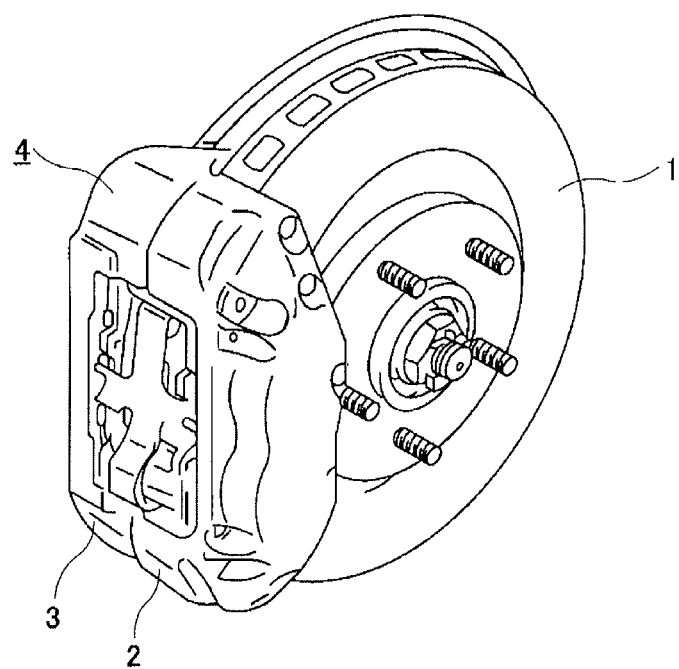
FIG. 15 is a perspective view of a first example of a disc brake assembly to which the invention is applied.

As shown in FIG. 14 which shows the results of the experiment, in the case of the pad of the comparison example being used, the value of the moment (M−R) is not increased until the cylinder hydraulic pressure reaches 2 MPa (which is sufficiently high as a cylinder hydraulic pressure resulting when the brakes of a passenger car are applied). It is found from this that a moment M is cancelled by a moment R until a cylinder hydraulic pressure reaches 2 MPa, whereby the pad is not rotated sufficiently and that the radially outer surface of the lug portion at the rotor entrance side does not abut against the radially outer surface of the guiding recessed groove (the pad is supported only at two locations). In contrast to this, in the case of the pad according to the invention being used, a moment (M−R) starts to increase when a cylinder hydraulic pressure reaches 0.5 MPa (which is sufficiently low as a cylinder hydraulic pressure resulting when the brakes of a passenger car are applied). Consequently, when the pad according to the invention is used, a moment $R(R_1)$ is suppressed sufficiently, ensuring a sufficient moment $M(M_1)$, and therefore, it is found that with the cylinder hydraulic pressure reaching 0.5 MPa, the pad rotates so that the radially inner surface of the lug portion at the rotor entrance side strikes the radially outer surface of the guiding recessed groove. In this way, using the pad according to the invention allows the pad to rotate even with the cylinder hydraulic pressure staying low, so that the pad can be supported at the three locations. Thus, it is verified that according to the pad of the invention, the generation of brake squeal that would otherwise be caused based on the vibration of the pad can be suppressed effectively.

Figure 16:
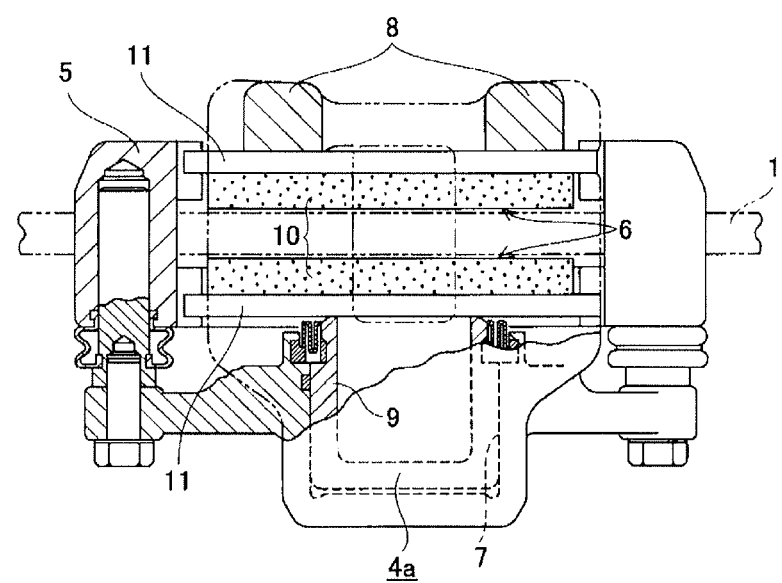
FIG. 16 is a partially cutaway view of a second example of a disc brake assembly to which the invention is applied as seen from a radially outer position.

The invention can be applied not only to the opposed piston-type disc brake assembly that has been described above as the embodiment of the invention but also to a floating caliper-type disc brake assembly as shown in FIG. 16. In the embodiment, although the construction is described in which the pair of lug portions are provided on the back plate which makes up the pad and when the pad rotates as a result of the brakes being applied, the radially outer surface of the lug portion at the rotor entrance side is brought into abutment with the radially outer surface of the guiding recessed groove, the invention can be carried out without being limited to the construction described. Namely, the invention can be carried out without imposing any specific limitation on the supporting construction and the torque bearing construction of the portion of the back plate at the rotor entrance side. Because of this, the lug portion does not have to be provided at the portion of the back plate at the rotor entrance side thereof. Additionally, when no lug portion is provided at the rotor entrance side, a construction can be adopted in which a pad pin is provided for suspension of a pad at a portion of a pad supporting member which lies at a rotor entrance side thereof, and this pad pin is loosely inserted through a through hole formed in a back plate. In the case of this construction being adopted, when the pad rotates, an inner circumferential surface of the through hole is supported (restrained) by the pad supporting member via the pad pin. Additionally, other construction can also be adopted. For example, a construction can also be adopted in which an outer circumferential edge portion of a portion on a back plate which lies at a rotor entrance side thereof is supported on a pad supporting member via a pin or the like, for example.

As this projecting arc-shaped surface portion, for example, a partially cylindrical surface can be adopted in which a center line of a curvature is disposed in an axial direction.

In the present invention, the disc brake pad is supported (restrained) on the pad supporting member at a total of three locations on the back plate including the radially inner surface of the lug portion and the torque transfer surface by a moment (M−R) which is exerted when the brakes are applied. The remaining portion on the back plate where the brake pad is supported on the pad supporting member when the brakes are applied is not limited to any particular location, and hence, the remaining support portion can be determined according to the design of the disc brake pad. For example, in the case of a pair of lug portions being provided on the back plate, a radially outer surface of the lug portion which is provided at a rotation entrance side can be adopted. Alternatively, a portion of an outer circumferential edge portion of the back plate which is situated at the rotation entrance side can also be adopted. Further, when a configuration is adopted in which a pin which is fixed to the pad supporting member is inserted through a through hole which is formed in such a way as to penetrate through the back plate, an inner circumferential surface of the through hole can also be adopted as the remaining location.

In addition, when a configuration is adopted in which a pair of lug portions are provided on the back plate, the pad can have a shape which is symmetrical in relation to a center line of the shape of the pad. In the case of this configuration being adopted, since the resulting pad can be used for both an outer pad and an inner pad, the fabrication work, managing work and assembling work can be facilitated.

In relation to the shape of portions of both the pads which are situated at rotation entrance sides thereof (a supporting construction and a torque receiving construction thereat), there is imposed no specific limitation. As with the portions at the rotation exit side, a construction can be adopted in which a guiding recessed groove and a torque bearing surface are provided or in which a pad pin is provided for suspension of a pad, and this pad pin is loosely inserted through a through hole formed in a back plate.

According to the disc brake pad and the disc brake assembly of the invention which are configured described heretofore, even in the event that the pressing force exerted by the piston is weak, it is possible to suppress effectively the generation of brake squeal.

Namely, in the case of the invention, the projecting arc-shaped surface portion is provided at the radially innermost portion on the radially inner surface of the lug portion which is situated at the rotor exit side. Therefore, the contact point between the radially inner surface of the lug portion and the pad supporting member (the radially inner surface of the guiding recessed groove) can be made stable. This makes it possible to prevent the radially inner surface of the lug portion from striking the pad supporting member (the radially inner surface of the guiding recessed groove) at an edge thereof when the brakes are applied. Consequently, it is possible to generate a moment ($r_{B0}$) acting in an opposite direction to a moment based on the brake tangential force which is generated as a result of the contact point being made unstable.

Further, in the case of the invention, the radially outer portion (the portion which lies nearer to the lug portion than the radially central position) of the torque transfer surface provided at the rotor exit side is situated in the position which lies closest to the rotor exit side on the torque transfer surface. This enables the center of a moment which is based on a frictional resisting force acting on the radially inner surface of the lug portion to approach a point of action of the frictional resisting force. Consequently, the moment based on the frictional resisting force can be reduced.

Thus, according to the invention, by devising the shapes of the radially inner surface of the lug portion and the torque transfer surface, the moment (R) which acts to cancel the moment (M) based on the brake tangential force can be reduced sufficiently. Because of this, even in the event that the pressing force exerted by the piston is weak, the pad can be rotated in the direction in which the moment based on the brake tangential force acts. Consequently, the pad can be supported on the pad supporting member at the three locations on the back plate, thereby making it possible to suppress effectively the generation of brake squeal.

Additionally, in the case of the invention, when the brakes are applied, the toque transfer surface is brought into abutment with (the torque bearing surface of) the pad supporting member in line contact at the radially outer portion of the torque transfer surface. Because of this, compared with the torque transfer surface is brought into abutment with the pad supporting member in surface contact as in the case of the conventional construction, it is possible to stabilize the contact state irrespective of braking conditions (high or low in cylinder hydraulic pressure). Consequently, it becomes easy to stabilize the posture of the pad, and the generation of brake squeal can also be suppressed in this respect.

What is claimed is:

1. A disc brake pad, configured to be supported to a pad supporting member so as to move in an axial direction of a rotor attached to a wheel of a vehicle, the disc brake pad comprising:
   a lining; and
   a back plate, supporting a rear surface of the lining, having a projecting lug portion and a torque transfer surface at a side edge portion of the back plate which is situated at an exit side of the rotor when the vehicle is moving in a forward direction such that a rotational direction of the rotor is counterclockwise, wherein
   the projecting lug portion projects towards the exit side of the rotor,
   the torque transfer surface is disposed at a portion of the side edge portion which is situated further inwards than the lug portion in a radial direction of the rotor,
   the projecting lug portion includes a first projecting arc-shaped surface portion which is disposed radially inward of a radially inner surface of the lug portion,
   a portion of the torque transfer surface which lies near to a radially outer end of the torque transfer surface and which is situated further radially inwards than both of the radially inner surface and an action line of a brake tangential force exerted on braking includes a second projecting arc-shaped surface portion at a radially outer end portion of the torque transfer surface, an apex of the second projecting arc-shaped surface portion being projected toward the exit side of the rotor more than any other portion of the torque transfer surface, and
   the torque transfer surface includes an inclined surface portion which is inclined towards an entrance side of the rotor from the second projecting arc-shaped surface portion as the inclined surface portion extends further radially inwards such that a radially outer side end of the inclined surface portion, which is connected to the second projecting arc-shaped surface portion, is projected more than a radially inner side end of the inclined surface portion in a circumferential direction of the rotor.

2. The disc brake pad according to claim 1, wherein the side edge portion of the back plate includes a recess portion which is concaved towards an entrance side of the rotor between the lug portion and the torque transfer portion.

3. A disc brake assembly comprising:
   a pad supporting member; and
   a pair of pads, each of which is the disc brake pad according to claim 1, and which are supported on the pad supporting member so as to move in an axial direction in relation thereto, and a piston which presses both the pads individually against both side surfaces of a rotor, wherein
   the pad supporting member includes a guiding, recessed groove configured to be brought into loose engagement with the lug portion, at a rotor exit side thereof, and
   the pad supporting member includes a torque bearing surface configured to be brought into abutment with the torque transfer surface, at a portion thereof which is situated further radially inwards than the guiding recessed groove.

4. The disc brake assembly according to claim 3, wherein the second projecting arc-shaped surface portion is brought into abutment with the torque bearing surface in line contact.

5. The disc brake assembly according to claim 3, wherein the inclined surface portion of the torque transfer surface is inclined with respect to an extending direction of the torque bearing surface.

\* \* \* \* \*